(12) United States Patent
Goy et al.

(10) Patent No.: US 12,742,665 B2
(45) Date of Patent: Sep. 22, 2026

(54) METHOD AND DEVICE FOR MEASURING A TEMPERATURE AND/OR A STRAIN IN AN OPTICAL FIBER

(71) Applicant: EOSS SA, Morges (CH)

(72) Inventors: Alexandre Goy, Cuarny (CH); Etienne Rochat, Valeyres-sous-Ursins (CH); Pedro José Vidal Moreno, Alcalá de Henares (ES); Miguel Gonzalez Herraez, Alcalá de Henares (ES)

(73) Assignee: EOSS SA, Morges (CH)

( * ) Notice: Subject to any disclaimer, the term of this patent is extended or adjusted under 35 U.S.C. 154(b) by 227 days.

(21) Appl. No.: 18/702,301

(22) PCT Filed: Oct. 18, 2021

(86) PCT No.: PCT/EP2021/078838

§ 371 (c)(1),
(2) Date: Apr. 17, 2024

(87) PCT Pub. No.: WO2023/066453

PCT Pub. Date: Apr. 27, 2023

(65) Prior Publication Data

US 2025/0012607 A1 Jan. 9, 2025

(51) Int. Cl.
*G01D 5/353* (2006.01)
*G01D 18/00* (2006.01)

(52) U.S. Cl.
CPC ..... *G01D 5/35361* (2013.01); *G01D 5/35364* (2013.01); *G01D 18/008* (2013.01)

(58) Field of Classification Search
CPC ........... G01D 5/35361; G01D 5/35364; G01D 18/004; G01D 18/006; G01D 18/008
See application file for complete search history.

(56) References Cited

U.S. PATENT DOCUMENTS

2007/0171402 A1* 7/2007 Watley .................. G01K 11/32 356/73.1
2017/0075029 A1 3/2017 Cuny et al.
(Continued)

FOREIGN PATENT DOCUMENTS

CN 208653669 U * 3/2019
WO 8707014 A2 11/1987
WO WO-2021152287 A1 * 8/2021 ......... G01D 5/35364

OTHER PUBLICATIONS

Zhou, Da-Peng et al. "Distributed Temperature and Strain Discrimination with Stimulated Brillouin Scattering and Rayleigh Backscatter in an Optical Fiber". Sensors, No. 13, Jan. 31, 2013, pp. 1836-1845. (Year: 2013).*

(Continued)

*Primary Examiner* — Michael A Lyons
(74) *Attorney, Agent, or Firm* — Slater Matsil, LLP

(57) ABSTRACT

In an embodiment, a method for measuring a temperature and/or a strain in an optical fiber includes calibrating the optical fiber by measuring a signal sensitive to an intensity and a phase of a Rayleigh backscattering signal of the optical fiber at known states of temperature and strain; measuring the signal at an unknown state of temperature and/or of strain; and, based on a shift of frequency or a correlation between the signal at known states of temperature and strain and the signal at an unknown state of temperature and/or of strain, determining, by technical means, the absolute value of the unknown state of temperature and/or the unknown state of strain, for at least one longitudinal position inside the optical fiber.

28 Claims, 9 Drawing Sheets

(56) References Cited

U.S. PATENT DOCUMENTS

2017/0299463 A1* 10/2017 Lecoeuche ......... G01M 11/3127
2018/0073959 A1* 3/2018 Lecoeuche ......... G01D 5/35361

OTHER PUBLICATIONS

Becker, Matthew W., et al., "Distributed Acoustic Sensing of Strain at Earth Tide Frequencies," Sensors, vol. 19, p. Apr. 27, 2019, 9 pages.
Boguszko, M., et al., "Property measurement utilizing atomic/molecular filter-based diagnostics," Science Direct, Progress in Aerospace Sciences 41, Feb. 1, 2005, 50 pages.
Koyamada, Yahei., et al., "Fiber-Optic Distributed Strain and Temperature Sensing With Very High Measurand Resolution Over Long Range Using Coherent OTDR," Journal of Lightwave Technology, vol. 27, No. 9, May 1, 2009, 5 pages.
Kreger Stephen T., et al., "Distributed strain and temperature sensing in plastic optical fiber using Rayleigh scatter," Fiber Optic Sensors and Applications VI, Proc. of SPIE, vol. 7316, 73160A, Apr. 27, 2009, 8 pages.
Kreger, Stephen T., et al., "High Resolution Distributed Strain or Temperature Measurements in Single- and Multi-mode Fiber Using Swept-Wavelength Interferometry," In Optical Fiber Sensors Oct. 23, 2006, 2006 (p. ThE42), Optica Publishing Group, 4 pages.
Kreger, Stephen T., et al., "High-Resolution Extended Distance Distributed Fiber-Optic Sensing Using Rayleigh Backscatter," Sensor Systems and Networks: Phenomena, Technology, and Applications for NOE and Health Monitoring 2007, Proc. of SPIE vol. 6530, 65301 R, Apr. 10, 2007, 10 pages.
NIST Publications, "Technical Digest: Symposium on Optical Fiber Measurements, 2022," NIST Sponsored by the National Institute of Standards and Technology in cooperation with the IEEE Lasers and Electro-Optics Society and the Optical Society of America, NIST Special Publication 988, Sep. 24-26, 2002, 238 pages total (Part 1 and 2).
Wang, Yuan, et al., "Strain measurement range enhanced chirped pulse f-OTDR for distributed static and dynamic strain measurement based on random fiber grating array," Optics Letters, vol. 45, No. 21, Nov. 2020, 4 pages.
Zhang, Li., et al., "Analysis and Reduction of Large Errors in Rayleigh-based Distributed Sensor," Journal of Lightwave Technology, vol. 37, No. 18, Sep. 15, 2019, 10 pages.
Zhang, Li., et al., "Rayleigh-Based Distributed Optical Fiber Sensing Using Least Mean Square Similarity," 26th International Conference on Optical Fiber Sensors, ThE29, Sep. 24, 2018, 4 pages.

* cited by examiner

[Fig. 1]
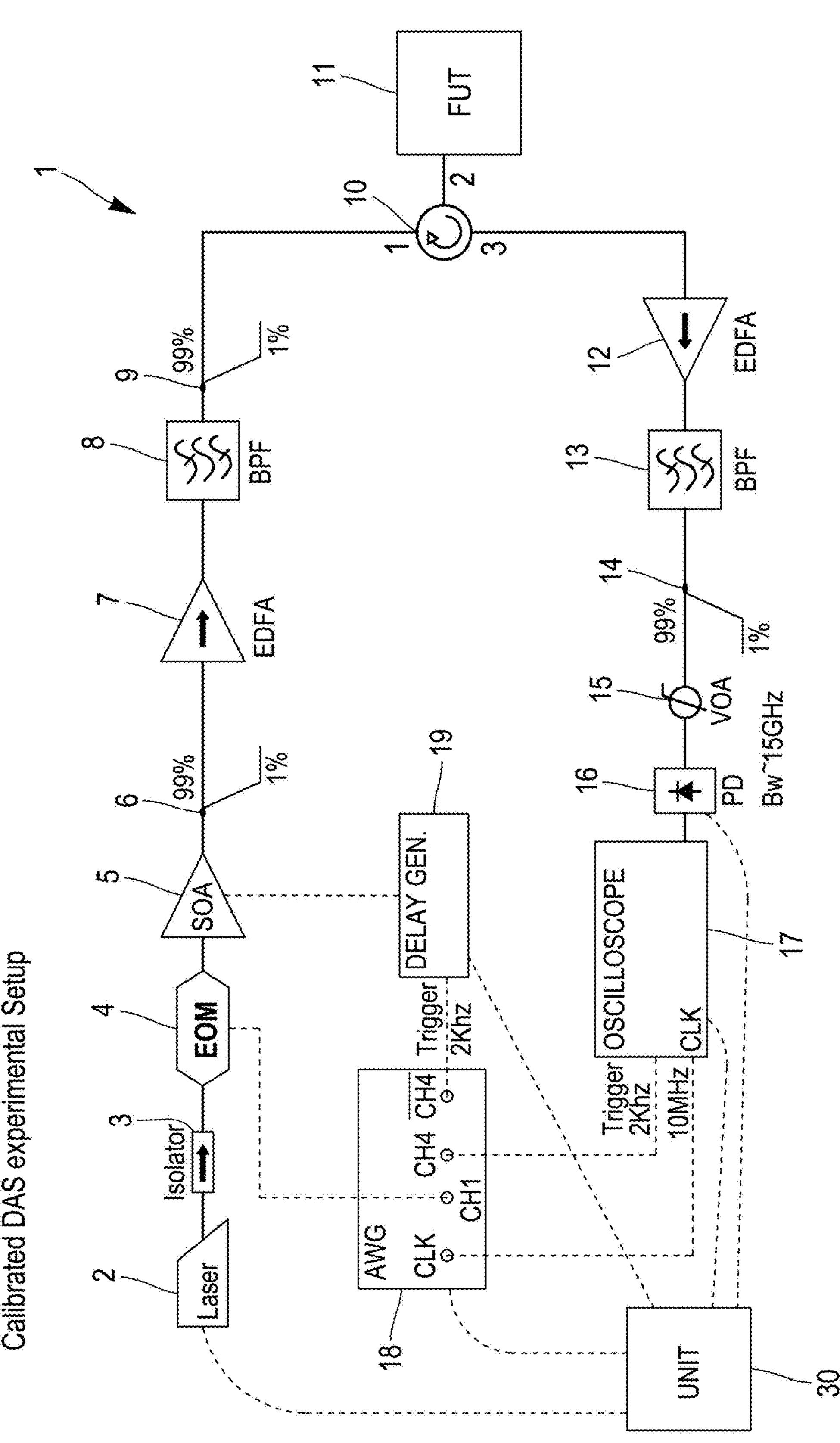

[Fig. 2]
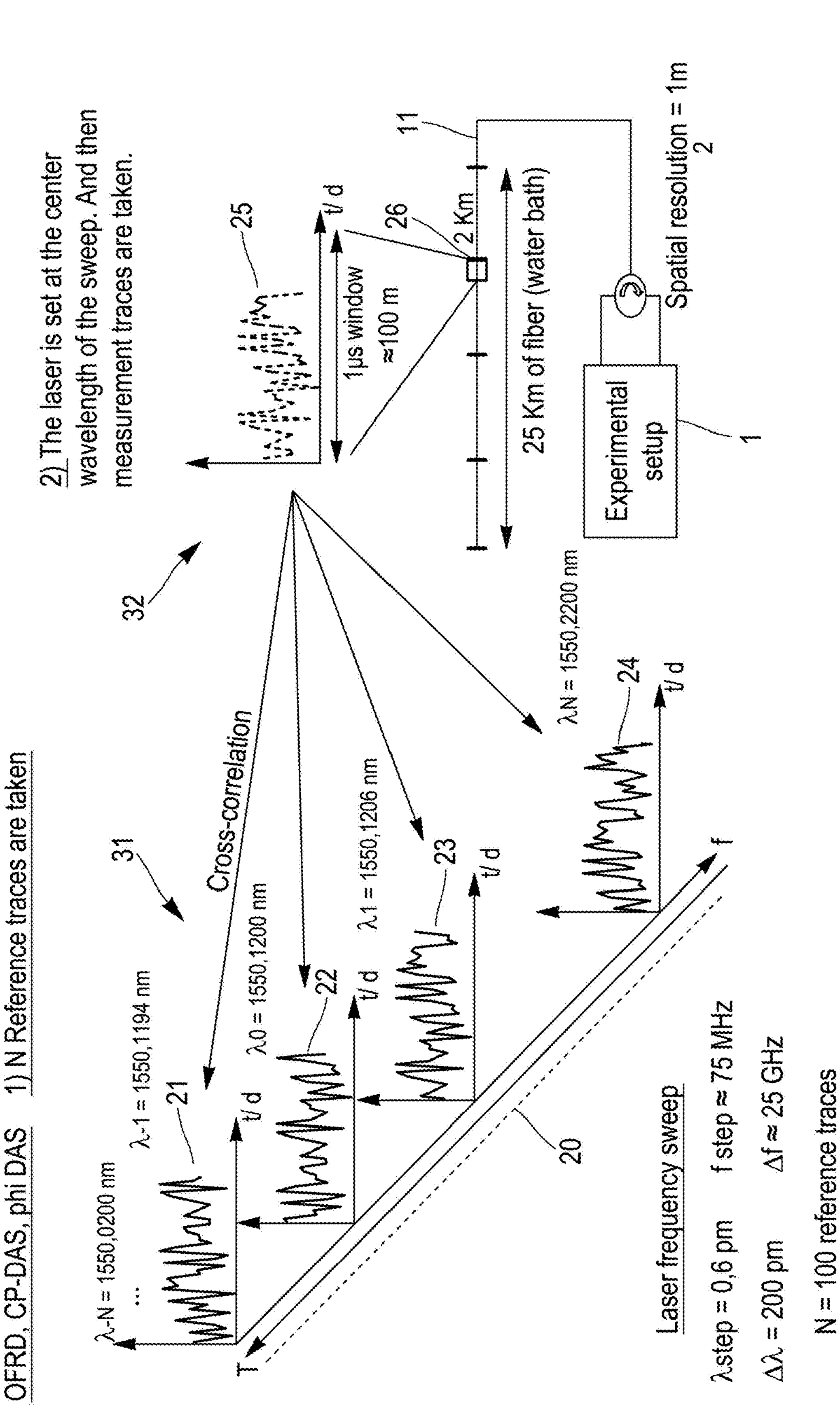

[Fig. 3]
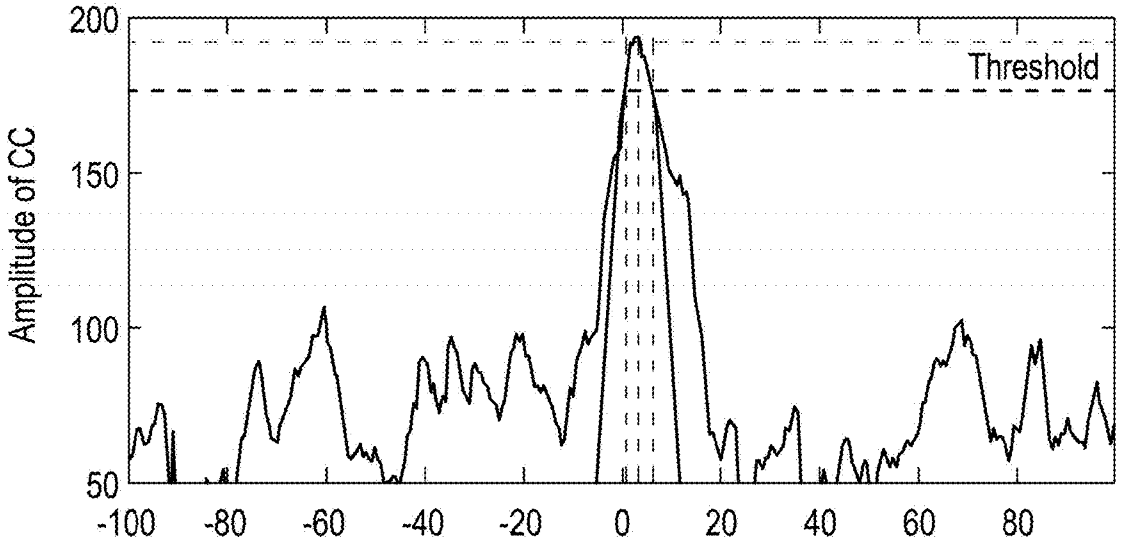
[Fig. 4]
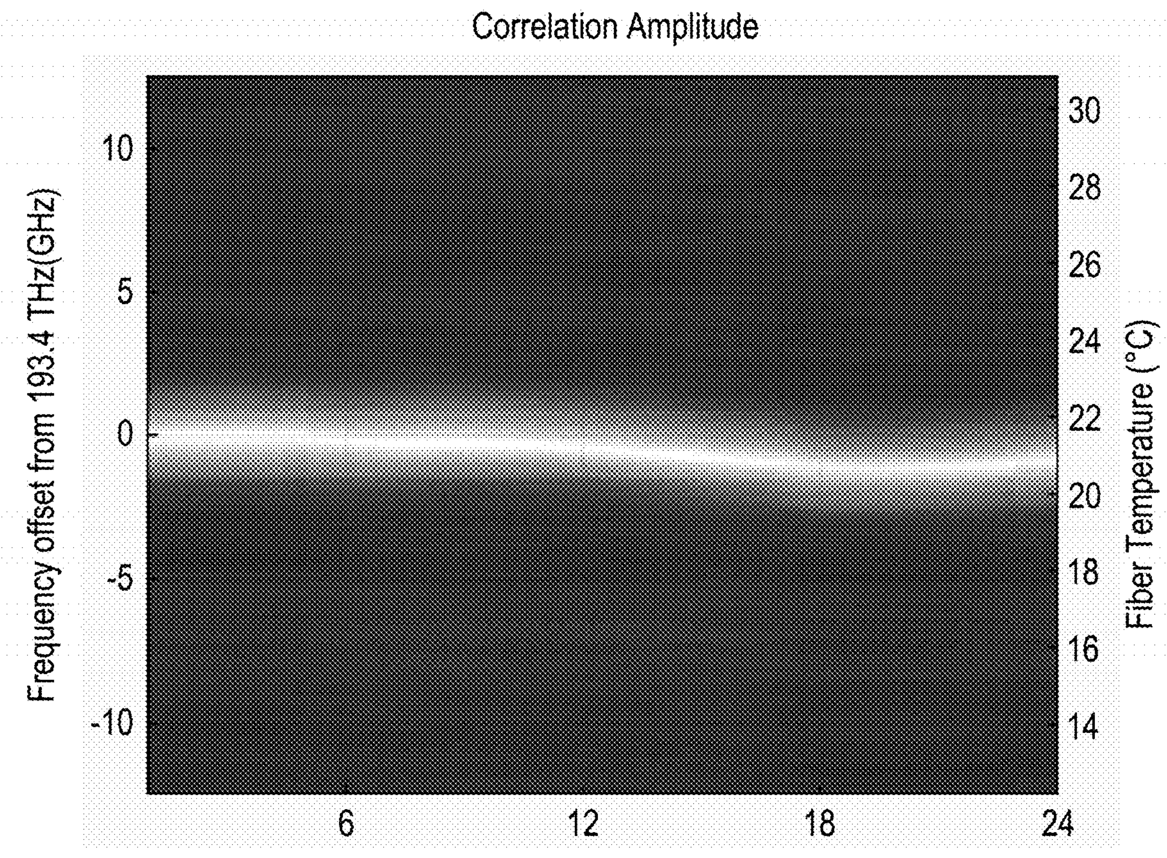

[Fig. 5]
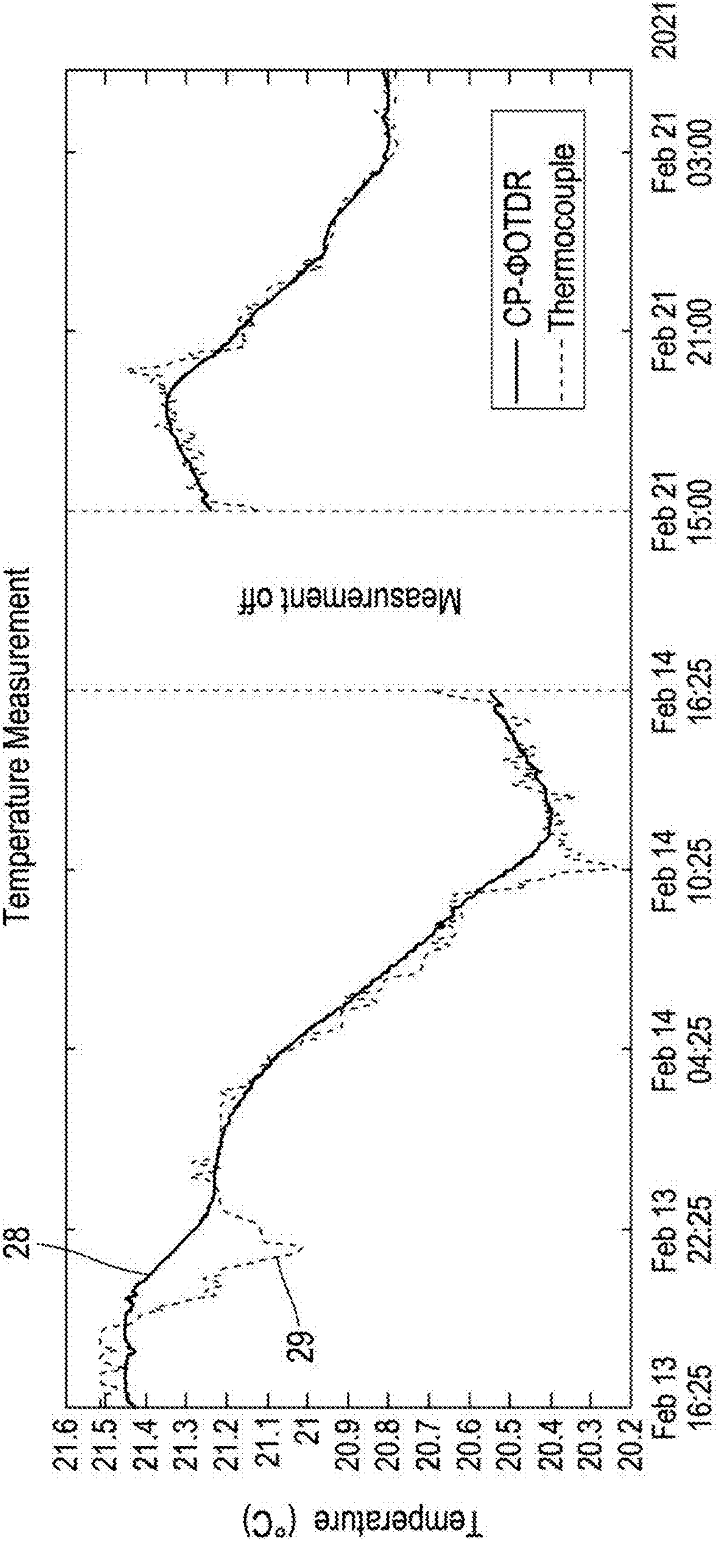

[Fig. 6]
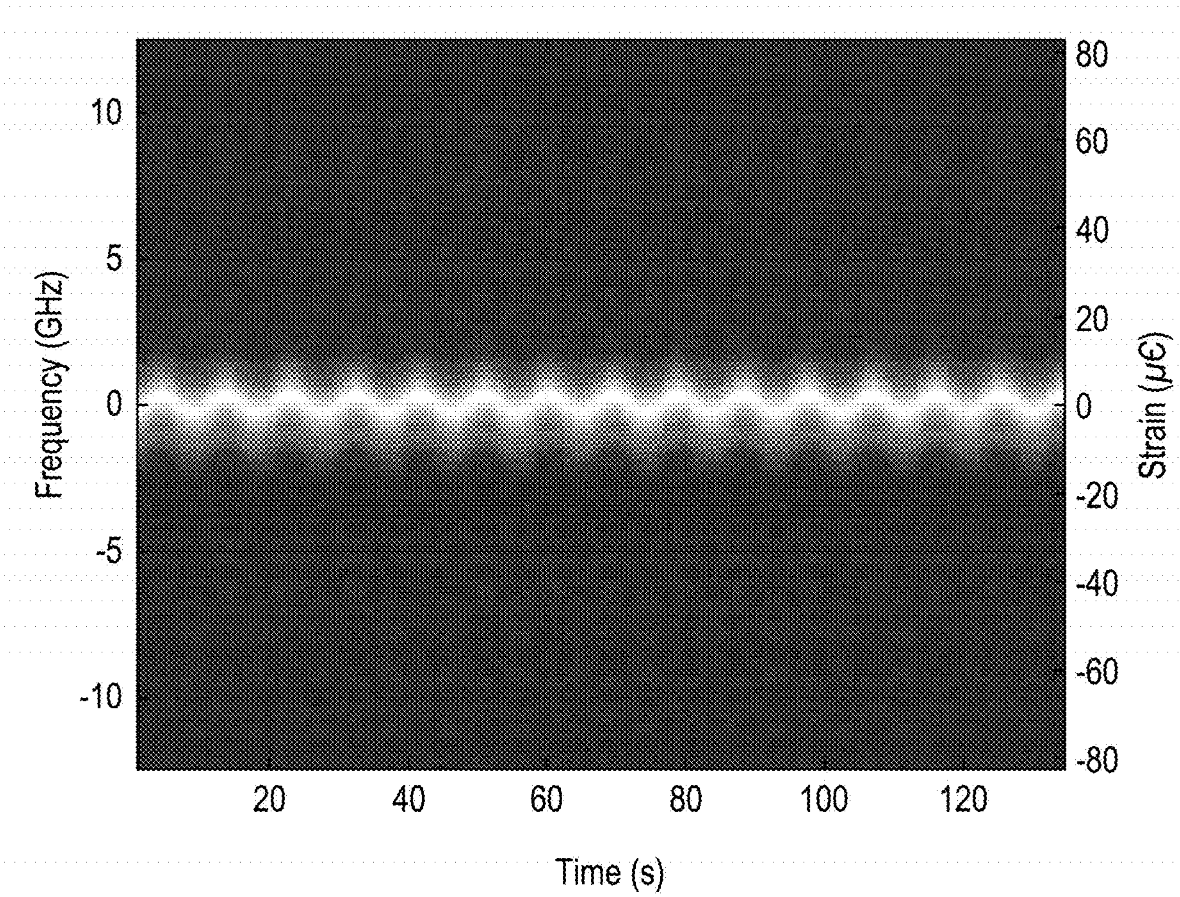

[Fig. 7]

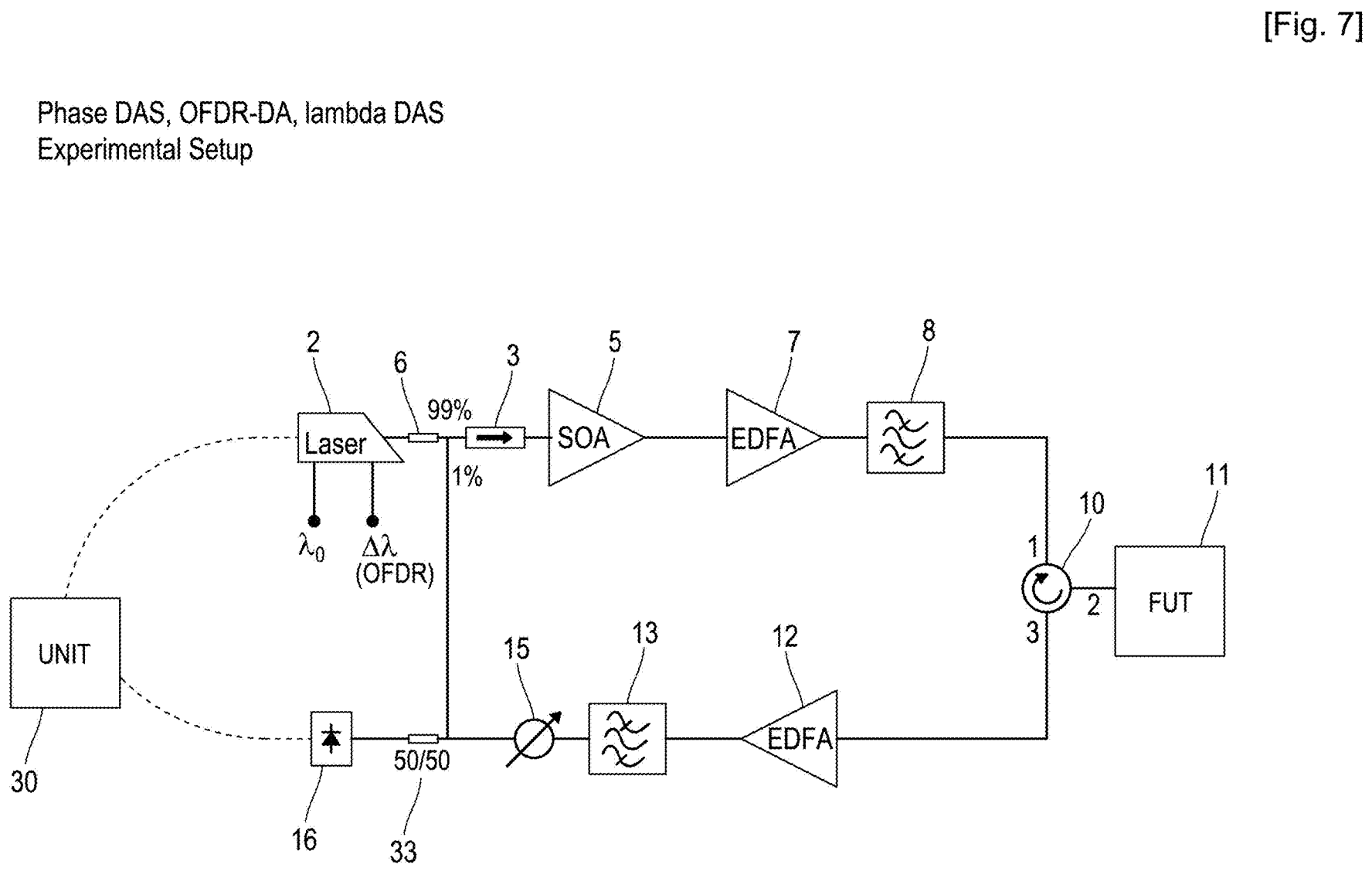

Phase DAS, OFDR-DA, lambda DAS
Experimental Setup

Laser
$\lambda_0$
$\Delta\lambda$ (OFDR)
99%
1%
SOA
EDFA
FUT
EDFA
50/50
UNIT
2 3 5 6 7 8 10 11 12 13 15 16 30 33

[Fig. 8]
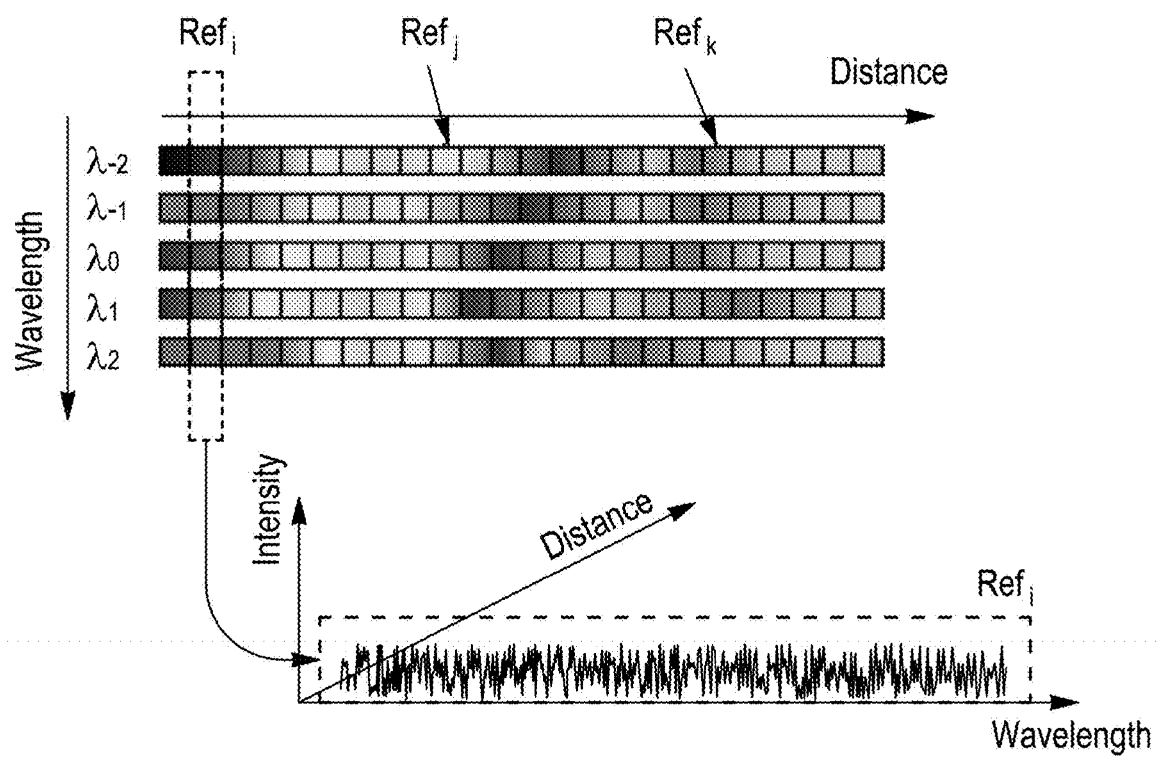

[Fig. 9]
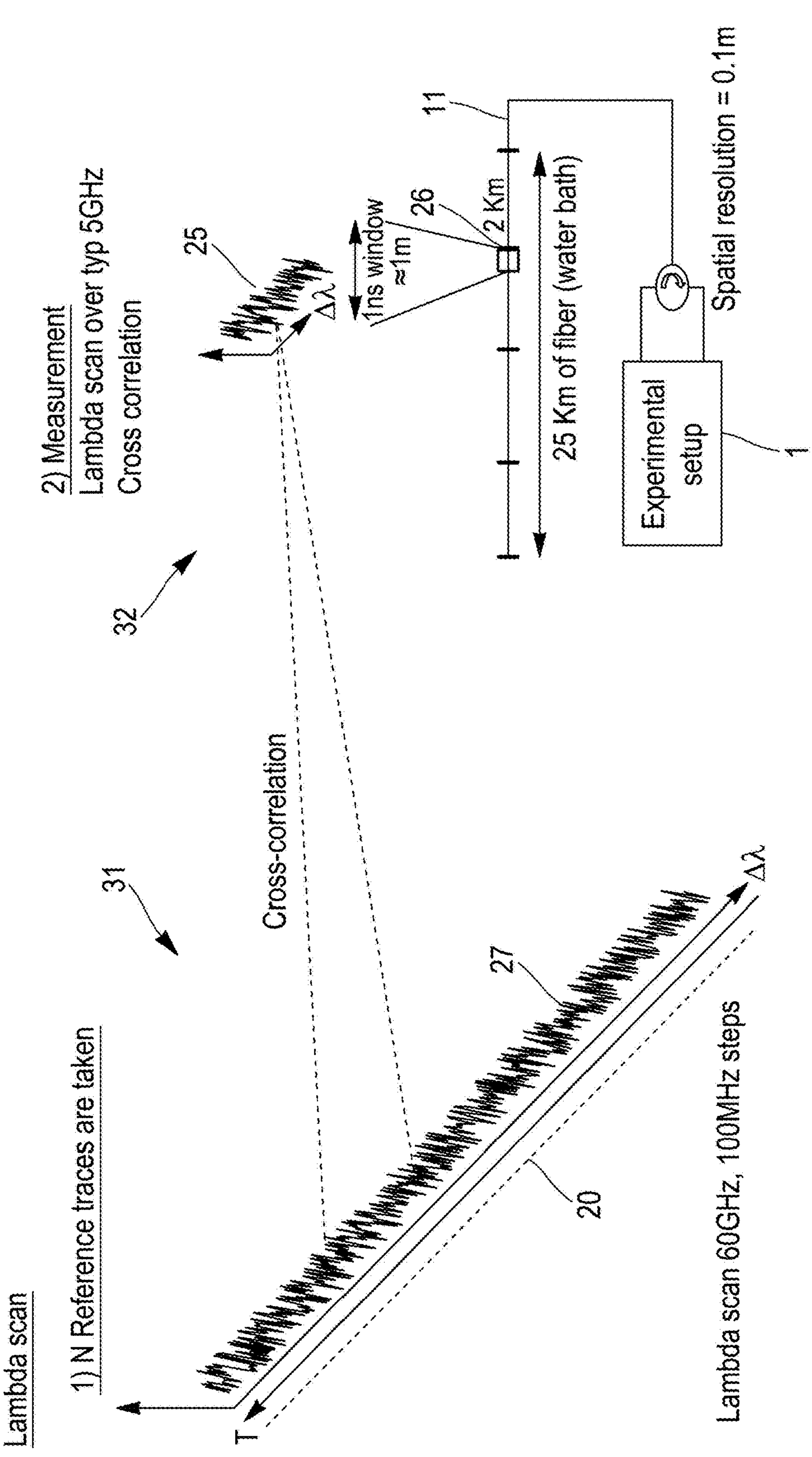

[Fig. 10]
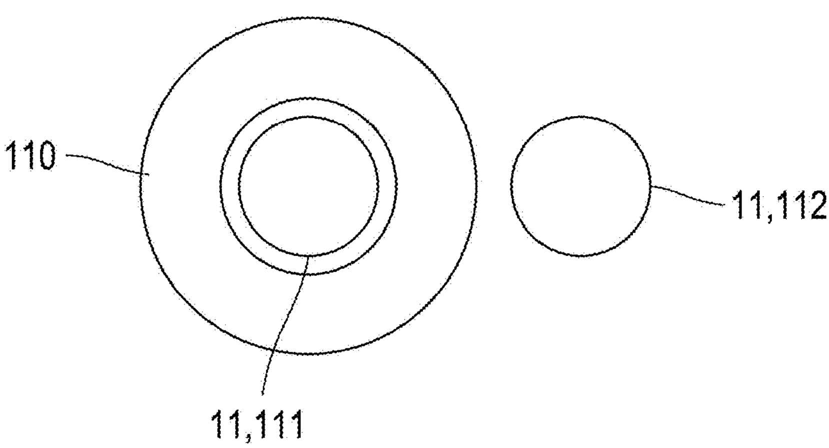

METHOD AND DEVICE FOR MEASURING A TEMPERATURE AND/OR A STRAIN IN AN OPTICAL FIBER

CROSS REFERENCE TO RELATED APPLICATIONS

This application is a National Stage of International Application No. PCT/EP2021/078838, filed on Oct. 18, 2021, which application is hereby incorporated by reference in their entirety.

TECHNICAL FIELD

The present invention relates to a method for measuring a temperature and/or a strain in an optical fiber.

The invention also relates to a device for implementing this method.

BACKGROUND

Raman or Brillouin measurement system are known for temperature and/or strain measurement in an optical fiber.

One can measure a temperature of the fiber with Distributed Temperature Sensing (DTS) using a Raman system or a Brillouin system and/or a strain of the fiber with Distributed Strain Sensing (DSS) using a Brillouin system.

The use of a Rayleigh system is not obvious for measuring an absolute value of temperature or strain.

Rayleigh backscattering (RBS) is commonly used to measure propagation loss in fiber. This is the so-called Optical Time Domain Reflectometry (OTDR). This is done by sensing a powerful pulse of broadband light (in other words, incoherent light) into a fiber and looking at the averaged RBS.

When the laser has a narrow linewidth (hence, high coherence), then there is enhanced interferometric noise (coherent noise) on the RBS. When looking at a single RBS (almost no averaging), the comparison of the coherent noise patterns of successive RBS measurements for any given position along the fiber provides information on the local variation of phase at the corresponding position. Since coherent noise is being used for detection, the technology became known as COTDR (Coherent OTDR) in the industry.

The technology has been further developed and one can identify four families in the time domain (OTDR).

Nevertheless, the use of a Rayleigh system has limited interests.

For instance, Becker et al (M. W. Becker and T. I. Coleman, "Distributed Acoustic Sensing of Strain at Earth Tide Frequencies," Sensors, vol. 19, p. 1975, 4 2019) report:

A short stability, typically a 0.5 day stability: that it does not allow for interruption within the measurement data series.

SUMMARY

An aspect of the invention concerns a method for measuring a temperature and/or a strain in an optical fiber, comprising the steps of:

- Calibrating the optical fiber by measuring a signal sensitive to an intensity and a phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and for at least one longitudinal position inside the fiber,
- Measuring the signal sensitive to an intensity and a phase of a Rayleigh backscattering signal of the optical fiber at an unknown state of temperature and/or an unknown state of strain, for various frequencies or wavelengths or wavenumbers of the backscattered signal and for at least one longitudinal position inside the fiber,
- Based on a shift of frequency or temporal period or wavelength or wavenumber or a correlation between: the signal sensitive to the intensity and the phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and the signal sensitive to the intensity and the phase of a Rayleigh backscattering signal of the optical fiber at an unknown state of temperature and/or an unknown state of strain, determining, by technical means, the absolute value of the unknown state of temperature and/or the unknown state of strain, for at least one longitudinal position inside the optical fiber.

The measurement of the signal sensitive to the intensity and the phase of a Rayleigh backscattering signal of the optical fiber at a known state of temperature and a known state of strain can be done for more frequencies or wavelengths than the measurement of the signal sensitive to the intensity and the phase of a Rayleigh backscattering signal of the optical fiber at an unknown state of temperature and/or an unknown state of strain.

The measurement of the signal sensitive to the intensity and the phase of a Rayleigh backscattering signal of the optical fiber at a known state of temperature and a known state of strain can be done for a frequency interval of at least 10 GHz, preferably at least 50 GHz.

The method according to the invention can comprise, before and/or during the calibration step, a measurement or setting of the known state of temperature and/or of the known state of strain.

The measurement or setting of the known state of temperature and/or of the known state of strain can be done less than one hour before the calibration step.

Preferably the measurement or setting of the known state of temperature can be done by measuring a temperature of the fiber with Distributed Temperature Sensing (DTS) using a Raman system or a Brillouin system, and/or with a thermometer, and/or by setting with a thermostat, and/or the measurement or setting of the known state of strain can be done by measuring a strain of the fiber with Distributed Strain Sensing (DSS) using a Brillouin system, and/or by setting with a guide guaranteeing a given bending radius of the fiber.

The method according to embodiments of the invention can simultaneously comprise: the calibration step, and the measurement or setting of the known state of temperature and/or of the known state of strain, and deployment of the fiber on site, preferably by unwinding the fiber from a spool, preferably by inserting the fiber into a sea or ocean.

The calibration step can be done using one of the four following sensing techniques:

- Wavelength scanning Optical Time Domain Reflectometry
- Chirped pulse Optical Time Domain Reflectometry
- Phase Optical Time Domain Reflectometry
- Optical Frequency Domain Reflectometry.

The calibration step and the measurement of the signal sensitive to the intensity and the phase of a Rayleigh backscattering signal of the optical fiber at an unknown state of temperature and/or an unknown state of strain can be done using the same sensing technique.

The Rayleigh backscattering signal of the optical fiber at a known state of temperature and a known state of strain and/or the Rayleigh backscattering signal of the optical fiber at an unknown state of temperature and/or an unknown state of strain can be obtained by injecting a laser beam in the optical fiber.

The Rayleigh backscattering signal of the optical fiber at a known state of temperature and a known state of strain and/or the Rayleigh backscattering signal of the optical fiber at an unknown state of temperature and/or an unknown state of strain can be obtained by injecting a laser beam in the optical fiber while the frequency or wavelength or wavenumber of the laser beam is measured and/or stabilized and/or locked.

The method according to embodiments of the invention can comprise a compensation of a drift of the laser between: the measurement of the Rayleigh backscattering signal of the optical fiber at a known state of temperature and a known state of strain and the measurement of the Rayleigh backscattering signal of the optical fiber at an unknown state of temperature and/or an unknown state of strain this compensation comprising preferably: refreshing the calibration of the optical fiber by measuring once again the signal sensitive to an intensity and a phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and for at least one longitudinal position inside the fiber, taking into account, during the determination step of the absolute value of the unknown state of temperature and/or the unknown state of strain, for at least one longitudinal position inside the optical fiber, a drift of the signal sensitive to an intensity and a phase of a Rayleigh backscattering signal of the optical fiber at a known state of temperature and a known state of strain between the initial calibration step and the refreshed calibration step.

The optical fiber can be in a protective sheath protecting it from strain variation, the determination step thus comprising determining, by technical means, the absolute value of the unknown state of temperature, for at least one longitudinal position inside the optical fiber.

The method according to embodiments of the invention can be implemented in two different optical fibers:

A first optical fiber, the determination step in the first optical fiber being based on a shift of a frequency or temporal period or wavelength or wavenumber or a correlation between the signal sensitive to the intensity and the phase of a Rayleigh backscattering signal of the first optical fiber at a first known state of temperature and a first known state of strain and the signal sensitive to the intensity and the phase of a Rayleigh backscattering signal of first the optical fiber at a first unknown state of temperature and the first known state of strain, this determination step of the first optical fiber determining the absolute value of the first unknown state of temperature for at least one longitudinal position inside the first optical fiber.

A second optical fiber, the determination step in the second optical fiber being based on:

The determination step determining the absolute value of the first unknown state of temperature for at least one longitudinal position inside the first optical fiber A shift of a frequency or temporal period or wavelength or wavenumber or a correlation between the signal sensitive to the intensity and the phase of a Rayleigh backscattering signal of the second optical fiber at a second known state of temperature and a second known state of strain and the signal sensitive to the intensity and the phase of a Rayleigh backscattering signal of second the optical fiber at a second unknown state of temperature and a second unknown state of strain, this determination step of the second optical fiber determining the absolute value of the second unknown state of strain for at least one longitudinal position inside the second optical fiber.

The first optical fiber can be in a protective sheath protecting it from strain variation.

Another aspect of embodiments of the invention concerns a device for measuring a temperature and/or a strain in an optical fiber, comprising: means for calibrating the optical fiber comprising means for measuring a signal sensitive to an intensity and a phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and for at least one longitudinal position inside the fiber, means for measuring the signal sensitive to an intensity and a phase of a Rayleigh backscattering signal of the optical fiber at an unknown state of temperature and/or an unknown state of strain, for various frequencies or wavelengths or wavenumbers of the backscattered signal and for at least one longitudinal position inside the fiber, determination means arranged to and/or configured to and/or programed to determine, based on a shift of frequency or temporal period or wavelength or wavenumber or a correlation between: the signal sensitive to the intensity and the phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and the signal sensitive to the intensity and the phase of a Rayleigh backscattering signal of the optical fiber at an unknown state of temperature and/or an unknown state of strain, the absolute value of the unknown state of temperature and/or the unknown state of strain, for at least one longitudinal position inside the optical fiber.

The means for measuring the signal sensitive to the intensity and the phase of a Rayleigh backscattering signal of the optical fiber at a known state of temperature and a known state of strain can be arranged for measuring the signal sensitive to the intensity and the phase of a Rayleigh backscattering signal of the optical fiber at a known state of temperature and a known state of strain for more frequencies or wavelengths than the measurement of the signal sensitive to the intensity and the phase of a Rayleigh backscattering signal of the optical fiber at an unknown state of temperature and/or an unknown state of strain.

The means for measuring the signal sensitive to the intensity and the phase of a Rayleigh backscattering signal of the optical fiber at a known state of temperature and a known state of strain can be arranged for measuring the signal sensitive to the intensity and the phase of a Rayleigh backscattering signal of the optical fiber at a known state of temperature and a known state of strain for a frequency interval of at least 10 GHz, preferably at least 50 GHz.

The device according to embodiments of the invention can comprise means for measuring or setting the known state of temperature and/or of the known state of strain;

preferably: the means for measuring or setting the known state of temperature can comprise means for measuring a temperature of the fiber with Distributed Temperature Sensing (DTS) using a Raman system or a Brillouin system, and/or with a thermometer, and/or for setting with a thermostat, and/or the means for measuring or setting the known state of strain can comprise means for measuring a strain of the fiber with Distributed Strain Sensing (DSS) using a Brillouin system, and/or for setting with a guide arranged for guaranteeing a given bending radius of the fiber.

The device according to embodiments of the invention can be arranged for simultaneously: calibrating the fiber by the calibrating means, and measuring or setting the known state of temperature and/or the known state of strain by the means for measuring or setting the known state of temperature and/or of the known state of strain, and deploying the fiber on site by deploying means, preferably comprising means for unwinding the fiber from a spool, preferably comprising means for inserting the fiber into a sea or ocean.

The means for calibrating the fiber can comprise one of the four following reflectometers:

Wavelength scanning Optical Time Domain Reflectometer

Chirped pulse Optical Time Domain Reflectometer

Phase Optical Time Domain Reflectometer

Optical Frequency Domain Reflectometer.

The means for calibrating the fiber and the means for measuring the signal sensitive to the intensity and the phase of a Rayleigh backscattering signal of the optical fiber at an unknown state of temperature and/or an unknown state of strain can comprise the same reflectometer or the same category of reflectometer among Wavelength scanning Optical Time Domain Reflectometer, Chirped pulse Optical Time Domain Reflectometer, Phase Optical Time Domain Reflectometer and Optical Frequency Domain Reflectometer.

The device according to embodiments of the invention can comprise means for injecting a laser beam in the optical fiber arranged to generate the Rayleigh backscattering signal of the optical fiber at a known state of temperature and a known state of strain and/or arranged to generate the Rayleigh backscattering signal of the optical fiber at an unknown state of temperature and/or an unknown state of strain.

The device according to embodiments of the invention can comprise means for measuring and/or stabilizing and/or locking the frequency or wavelength or wavenumber of the laser beam while the laser beam is injected in the fiber in order to generate the Rayleigh backscattering signal of the optical fiber at a known state of temperature and a known state of strain or in order to generate the Rayleigh backscattering signal of the optical fiber at an unknown state of temperature and/or an unknown state of strain is obtained by injecting a laser beam in the optical fiber.

The device according to embodiments of the invention can comprise means for compensating a drift of the laser between: the measurement of the Rayleigh backscattering signal of the optical fiber at a known state of temperature and a known state of strain and the measurement of the Rayleigh backscattering signal of the optical fiber at an unknown state of temperature and/or an unknown state of strain the compensation means comprising preferably: means for refreshing the calibration of the optical fiber by measuring once again the signal sensitive to an intensity and a phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and for at least one longitudinal position inside the fiber, the determination means arranged to and/or configured to and/or programed to take into account, during the determination of the absolute value of the unknown state of temperature and/or the unknown state of strain, for at least one longitudinal position inside the optical fiber, a drift of the signal sensitive to an intensity and a phase of a Rayleigh backscattering signal of the optical fiber at a known state of temperature and a known state of strain between an initial calibration of the fiber and a refreshed calibration of the fiber.

The device according to embodiments of the invention can comprise a protective sheath arranged for protecting the fiber from strain variation.

An other aspect of embodiments of the invention concerns a system comprising: A first device according to embodiments of the invention, for measuring a temperature and/or a strain in a first optical fiber, A second device according to embodiments of the invention, for measuring a temperature and/or a strain in a second optical fiber, characterized in that:

The determination means of the first device being arranged to and/or configured to and/or programed, based on a shift of a frequency or temporal period or wavelength or wavenumber or a correlation between: the signal sensitive to the intensity and the phase of a Rayleigh backscattering signal of the first optical fiber at a first known state of temperature and a first known state of strain and the signal sensitive to the intensity and the phase of a Rayleigh backscattering signal of first the optical fiber at a first unknown state of temperature but the first known state of strain, to determine the absolute value of the first unknown state of temperature for at least one longitudinal position inside the first optical fiber, The determination means of the second device being arranged to and/or configured to and/or programed, based on:

the absolute value of the first unknown state of temperature for at least one longitudinal position inside the first optical fiber, determined by the determination means of the first device, and A shift of a frequency or temporal period or wavelength or wavenumber or a correlation between: the signal sensitive to the intensity and the phase of a Rayleigh backscattering signal of the second optical fiber at a second known state of temperature and a second known state of strain and the signal sensitive to the intensity and the phase of a Rayleigh backscattering signal of second the optical fiber at a second unknown state of temperature and a second unknown state of strain, to determine the absolute value of the second unknown state of strain for at least one longitudinal position inside the second optical fiber.

BRIEF DESCRIPTION OF THE DRAWINGS

Other advantages and characteristics of the invention will appear upon examination of the detailed description of embodiments which are in no way limitative, and of the appended drawings in which:

FIG. 1 illustrates a preferred embodiment of a device 1 according to an embodiment the invention in a CP-DAS case, FIG. 2 is a schematic view of different steps (calibration step 31 and measurement step 32) of an embodiment of a method 100 according to an embodiment of the invention implemented by device 1 of FIG. 1, FIG. 3 is an auto-correlation result of the determination step following steps 31 and 32 of FIG. 2, FIG. 4 illustrates the determined temperature over time following steps 31 and 32 of FIG. 2 (horizontal axis: time in hour; left vertical axis: frequency offset in GHz; right vertical axis: temperature in ° C. of fiber 11; greyscale level: correlation amplitude from low (dark) to high (white)), FIG. 5 illustrates the determined temperature over time following steps 31 and 32 of FIG. 2 (horizontal axis: time (date and hour); left vertical axis: temperature in ° C. of fiber 11), FIG. 6 illustrates the determined strain over time following steps 31 and 32 of FIG. 2 (horizontal axis: time in seconds; left vertical axis: frequency offset in GHz; right vertical axis: strain in of fiber 11; greyscale level: correlation amplitude from low (dark) to high (white)), FIG. 7 illustrates an embodiment of a device 1 according to embodiments of the invention in a Phase-DAS case or an OFDR case or a lambda DAS case, FIG. 8 illustrates the wavelength DAS calibration concept, FIG. 9 is a schematic view of different steps (calibration step 31 and measurement step 32) of an embodiment of a method 100 according to embodiments of the invention implemented by device 1 of FIG. 7 in the lambda DAS case, and FIG. 10 is a front sectional view of two optical fibers 111, 112 in which the method 100 is implemented preferably at the same time.

These embodiments being in no way limitative, we can consider variants of the invention including only a selection of characteristics subsequently described or illustrated, isolated from other described or illustrated characteristics (even if this selection is taken from a sentence containing these other characteristics), if this selection of characteristics is sufficient to give a technical advantage or to distinguish the embodiments of invention over the state of the art. This selection includes at least one characteristic, preferably a functional characteristic without structural details, or with only a part of the structural details if that part is sufficient to give a technical advantage or to distinguish embodiments of the invention over the state of the art.

We are now going to describe, in reference to FIGS. 1 to 10, embodiments of a device 1 according to the invention implementing embodiments of a method 100 according to the invention.

Method 100 is a method for measuring a temperature and/or a strain in an optical fiber 11.

DETAILED DESCRIPTION OF ILLUSTRATIVE EMBODIMENTS

Embodiments of this application present a method or device, based on Rayleigh backscattering signal, allowing to measure a temperature and/or strain in an optical fiber: having an improved stability time, and/or allowing for interruption within the measurement data series.

Method 100 comprises, before and/or preferably during the calibration step 31, a measurement of a known state of temperature in the optical fiber 11 for at least one longitudinal position inside the fiber 11 and/or of a known state of strain in the optical fiber 11 for at least one longitudinal position 26 inside the fiber 11. The known state of temperature and/or of the known state of strain is done less than one hour before the calibration step 31.

A "known" state is: a measured state or a a priori known state (without measure): for example, a fiber which rests straight on the ground, without external pressure, with an almost infinite radius of curvature, can be considered a priori in a state of zero strain.

The measurement of the known state of temperature is done: by measuring the known temperature of the at least one longitudinal position in the fiber 11 with Distributed Temperature Sensing (DTS) using a Raman system or a Brillouin system, and/or by placing the at least one longitudinal position of the optical fiber 11 in a thermal bath at the known temperature with a thermostat or in contact with a thermometer.

The measurement of the known state of strain is done: by measuring the known strain of the at least one longitudinal position in the fiber 11 with Distributed Strain Sensing (DSS) using a Brillouin system, and/or by placing the at least one longitudinal position of the optical fiber 11 in a known state of strain.

Indeed, the future calibration step is possible if stable and measurable conditions is applied to the fiber 11 during the initial measurement of a known state. This can be done for instance by: having a loosely coiled fiber 11 (zero strain) at constant temperature (in a thermally controlled environment) whilst using a calibrated thermometer to get the absolute temperature (T) value using a DTS (for instance Raman system or Brillouin system) to measure temperature along the fiber 11, whilst the fiber 11 is loosely coiled using both DTS and DSS to measure both temperature and strain condition of the fiber 11.

It must be understood that the calibration error will be defined by the accuracy of the DTS/DSS measurement, which is way above the sensitivity of a Distributed acoustic sensing (DAS) system.

For example, if one is using a 1K calibrated thermometer, there will be a 1K absolute error on the temperature along the fiber 11, although it will be possible to measure changes which are in the order of 1 mK.

By cable is meant in the present description any cable equipped with at least one optical fiber 11.

Example of known and measurable condition for strain are: use a cable with loose tube fiber design 11,111 (strain free) for temperature measurement and one tight buffer 11, 112 sensitive to strain and temperature. Both fibers 111, 112 are calibrated. This allows splitting between temperature and strain measurement. One can use the cable or fiber 11 coiled on a carrousel to perform calibration as the geometry is given for all layers and all cable or fiber 11 position as a function of distance, then bending (and therefore strain) is defined at all cable or fiber 11 position. By measuring the full cable or fiber 11, one gets local calibration coefficient a carrousel carrying the fiber 11 can be on a vessel so that calibration is done in-situ Example of a dynamic known measurable condition to build the database (strain) are: when a cable or fiber 11 is installed, there are known trajectories on the vessel. A guide can guarantee a given bending radius of the fiber whilst exiting the vessel. The length over which the bending radius is maintained is short on this section. With a pick-up mechanism and a cable or fiber 11 path to a catenary (the exit shape), there are clearly position with known bending radius.

- during installation, the cable or fiber n will go through these positions. In the cable or fiber 11 frame of reference, this is equivalent to having a moving known bending radius over distance, starting from the distal end. Thus, as a function of the installation/cable or fiber 11 speed and the time, one knows at which position is the defined bending radius. This can be used for "on the fly" calibration. The cable having a strain measurement fiber 11, it is possible to measure on a regular basis (regularly or following a fault) the cable or fiber 11 bending status in both DTS/DSS, it is interesting to combine known state with measured state use a cable with loose tube fiber 11, 111 design (strain free) for temperature measurement and one tight buffer 11, 112 sensitive to strain and temperature. Both fibers 111, 112 are calibrated. This allows splitting between temperature and strain Preferably, method 100 simultaneously comprises: the calibration step 31, and the measurement or setting of the known state of temperature (typically with DTS or thermometer or thermostat) and/or of the known state of strain (typically with DSS or a guide arranged for guaranteeing a given bending radius of the fiber 11), and deployment of the fiber 11 on site, preferably by unwinding the fiber from a spool, preferably by inserting the fiber into a sea or ocean.

The known states of temperature and/or strain are then memorized in unit 30.

Calibration Step 31/Rayleigh Measuring Step at the Known State

Method 100 comprises the step 31 of calibrating the optical fiber 11 (i.e., a Rayleigh measuring step at the known state of temperature and the known state of strain) by measuring an electronic (analogic or digital) signal 21, 22, 23, 24, 27 (from a detector 16) sensitive to (and from) an intensity I and a phase ϕ of an optical Rayleigh backscattering signal of the optical fiber 11 at the known state of temperature and the known state of strain, for various frequencies (noted f or v) or wavelengths or wavenumbers of the backscattered signal (preferably equal (or almost equal in case of CP-DAS) to frequency or wavelength or wavenumber of an excitation laser 2) and for the at least one longitudinal position 26 inside the fiber 11.

Unit 30 memorizes a database of such electronic (analogic or digital) signal 21, 22, 23, 24, 27 (from a detector 16) sensitive to (and from) an intensity I and a phase ϕ of an optical Rayleigh backscattering signal of the optical fiber 11 at the known state of temperature and the known state of strain, for various frequencies or wavelengths or wavenumbers of the backscattered signal and for at the least one longitudinal position 26 inside the fiber 11.

In the present specification, each signal 21, 22, 23, 24, 27, 25 can have one component or several components, preferably two components (one intensity component and one phase component) for phase DAS or preferably one mixed component (intensity and phase component) for CP DAS, lambda DAS or OFDR.

The measurement of the signal sensitive to the intensity and the phase of a Rayleigh backscattering signal of the optical fiber 11 at a known state of temperature and a known state of strain is done for a frequency interval of at least 5 GHz, preferably at least 10 GHz, more preferably at least 50 GHz.

The calibration step 31 is done using one of the four following Distributed acoustic sensing (DAS) techniques:

one Optical Time Domain Reflectometry (OTDR) technique (but preferably not Coherent Optical Time Domain Reflectometry also known as C OTDR having a non-linear response) preferably among one of the three following (having a linear response):

Wavelength scanning Optical Time Domain Reflectometry (also known as λ-scanning OTDR or λ OTDR or lambda OTDR or lambda DAS or λ DAS), or Chirped pulse Optical Time Domain Reflectometry (also known as Chirped-pulse OTDR or CP OTDR or Chirped-pulse DAS or CP DAS), or Phase Optical Time Domain Reflectometry (also known as phase or phi or Φ or φ OTDR; or phase or phi or Φ or φ DAS), or Optical Frequency Domain Reflectometry (also known as OFDR).

The Rayleigh backscattering signal of the optical fiber 11 at a known state of temperature and a known state of strain is obtained by injecting a laser beam in the optical fiber 11.

For a chirp system (CP-DAS), this is about moving the central frequency of the chirp over a wide bandwidth corresponding to the maximum calibration range, typically the following sensitivity (at 1550 nm): −1.335 GHz/K and −150 MHz/E. A frequency range sufficient to have "calibration" data over the expected range is scanned: for instance, if looking at temperature only within the 0-100° C. range, then the scan must be at least 133 GHz.

likewise for strain; if one wants to measure 1% (this is be the case for deformation/bending radius measurement), then the scan range is 1e4×150 MHz, thus 1.5 THz.

As the frequency shift is the same for all DAS families, this give the order of magnitude for all techniques λ DAS, CP DAS, Φ DAS and OFDR.

One can consider an OFDR instead of a OTDR (a wide scan in the frequency domain with a long pulse instead of a short pulse, with different processing). The principle is the same; it is above moving the laser central frequency for each of the measurement in order to build the database For a λ-DAS, the database is obtained by scanning over a wide range with respect to the later measurement.

For a phase DAS, the database is obtained by scanning over a wide frequency range with respect to the measurement.

It is possible to change the laser frequency, and/or it is also possible to change the reference condition. Assuming is it possible to change the temperature of the fiber 11 being calibrated in a well-controlled way, then the effect is equivalent to changing the frequency of laser 2 whilst keeping the temperature of fiber 11 constant (the phase is a function of the index of refraction, which is temperature and strain sensitive and of the wavelength/frequency, so that changing an either the frequency whilst keeping temperature/strain constant or changing temperature/strain whilst keeping frequency constant is equivalent in terms of phase variation).

Thus, and regardless of the DAS family, it is possible to link changes in phase with changes and temperature/strain and frequency, by varying one or the other.

Thus, all the embodiments and variants of the invention described with reference to FIGS. 1 to 10 can be generalized by replacing "a signal 21, 22, 23, 34, 27 sensitive to an intensity and a phase of a Rayleigh backscattering signal of the optical fiber (11) at a known state of temperature and a known state of strain, for various frequencies or wavelengths or wavenumbers of the backscattered signal and for at least one longitudinal position inside the fiber," by "a signal 21, 22, 23, 34, 27 sensitive to an intensity and a phase of a Rayleigh backscattering signal of the optical fiber (11) at a known state of temperature and a known state of strain, for: various conditions of frequencies or wavelengths or wavenumbers of the backscattered signal and/or various conditions of known states of temperature and/or known states of strain, and for at least one longitudinal position inside the fiber.

Method 100 recovers the phase shift at a given conditions with respect to the calibrated data: for a CP-DAS, this is done by comparing the measured chirped trace with the stored data-based and by computing the shift for a lambda-DAS, this is done by identifying which section of the wide measurement the current narrow scan is matching best for a phase-DAS, this is done similarly to CP-DAS by comparing the measurement with the database (no need for scanning at the measurement time). for an OFDR, this is done similarly to CP-DAS by comparing the measurement with the database and computing the shift.

Rayleigh Measuring Step 32 at the Unknown State of Temperature and/or Unknown State of Strain, and Determination Step Method 100 comprises then the following steps:

A step 32 of measuring the electronic (analogic or digital) signal 25 (from the detector 16) sensitive to (and from) an intensity and a phase of an optical Rayleigh backscattering signal of the optical fiber 11 at an unknown state of temperature and/or an unknown state of strain, for various frequencies or wavelengths or wavenumbers of the backscattered signal and for the at least one longitudinal position 26 inside the fiber 11; signal 25 is memorized in unit 30; and Based on a shift of frequency or temporal period or wavelength or wavenumber or a correlation between: the signal 21, 22, 23, 24, 27 sensitive to the intensity and the phase of a Rayleigh backscattering signal of the optical fiber 11 at a known state of temperature and a known state of strain, for various frequencies or wavelengths or wavenumbers of the backscattered signal and the signal 25 sensitive to the intensity and the phase of a Rayleigh backscattering signal of the optical fiber 11 at an unknown state of temperature and/or an unknown state of strain, a step of determining, by technical means (by unit 30), the absolute value of the unknown state of temperature and/or the unknown state of strain, for the at least one longitudinal position 26 inside the optical fiber 11.

The term absolute value of temperature is understood to mean a value (typically in ° C., or Kelvin or ° F.) which is not relative i.e. is not a simple deviation from an unknown temperature reference.

The term absolute value of strain is understood to mean a value (typically in με) which is not relative i.e. is not a simple deviation from an unknown strain reference.

The measurement of the signal 21, 22, 23, 24, 27 sensitive to the intensity and the phase of a Rayleigh backscattering signal of the optical fiber 11 at a known state of temperature and a known state of strain is done for more frequencies or wavelengths than the measurement of the signal 25 sensitive to the intensity and the phase of a Rayleigh backscattering signal of the optical fiber 11 at an unknown state of temperature and/or an unknown state of strain.

The calibration step 31 and the measurement of the signal 25 sensitive to the intensity and the phase of a Rayleigh backscattering signal of the optical fiber at an unknown state of temperature and/or an unknown state of strain are done using the same sensing technique among λ DAS, CP DAS, Φ DAS and OFDR.

The Rayleigh backscattering signal of the optical fiber at an unknown state of temperature and/or an unknown state of strain is obtained by injecting a laser beam in the optical fiber 11.

Thus, once the system has been calibrated (available database), then, a change in temperature or strain in fiber 11 is measured as the difference between the current laser frequency and the laser frequency in the database that provides the same Intensity I, Phase ϕ measurement pattern locally. In other words, if the local I, ϕ is found in the database at the same laser frequency, there was no change. If it is found at a different frequency, then the strain change Δϵ or temperature change ΔT can be related through the relation:

$$\Delta\nu = \nu k_\epsilon \Delta\epsilon = \nu k_T \Delta T$$

where υ is the central frequency of the references array, $k_\epsilon$ is a constant relating strain and frequency shift and $k_T$ is a constant relating temperature and frequency shift.

To reduce computation time, one can assume that changes are small with respect to the stored data. Thus, for a given laser frequency/measurement, there is no need to check the complete data base of signals 21, 22, 23, 24, 27 for every point. It is likely that looking at the 2-3 adjacent traces in the database is sufficient. If the event is larger, then gradually increase the search in the database.

This trace recovery principle according to embodiments of the invention can be done in the time domain or in the frequency domain.

In the time domain, applying the trace recovery principle can involve using a gauge length for computing the similarity of the reference and measured traces which is much longer than the pulse width, in order to have sufficient features for obtaining a reasonably high confidence in the similarity estimation. This can imply losing spatial resolution, which is generally unwanted, hence the operation is more usually done in the frequency domain.

In the frequency domain, the trace recovery principle involves the acquisition of two frequency sweeps (a reference sweep and a measurement sweep) and computing the similarity in the spectra recorded at each position.

To use this calibration principle, the spatial resolution is preferably sufficiently small so that the spatial thermal/strain gradients appearing along the fiber 11 are not causing a deformation of the acquired I, ϕ patterns with respect to those stored in the database. As a first estimation, differential thermal and/or strain spatial gradients across the spatial resolution is preferably be kept below the temperature or strain measurement resolution of the method divided by 5.

Quality Improvement

The Rayleigh backscattering signal of the optical fiber 11 at a known state of temperature and a known state of strain and the Rayleigh backscattering signal of the optical fiber at an unknown state of temperature and/or an unknown state of strain is obtained by injecting a laser beam in the optical fiber 11 while the wavelength of the laser beam is measured and/or stabilized and/or locked.

Method 100 comprises a compensation of a drift of the laser between: the measurement of the Rayleigh backscattering signal of the optical fiber 11 at a known state of temperature and a known state of strain and the measurement of the Rayleigh backscattering signal of the optical fiber 11 at an unknown state of temperature and/or an unknown state of strain this compensation comprising:

refreshing the calibration step 31 of the optical fiber 11 by measuring once again the signal sensitive to an intensity and a phase of a Rayleigh backscattering signal of the optical fiber at a known state of temperature and a known state of strain, for various frequencies or wavelengths or wavenumbers of the backscattered signal and for at least one longitudinal position inside the fiber 11, taking into account, during the determination step of the absolute value of the unknown state of temperature and/or the unknown state of strain, for at least one longitudinal position inside the optical fiber 11, a drift of the signal sensitive to an intensity and a phase of a Rayleigh backscattering signal of the optical fiber at a known state of temperature and a known state of strain between the initial calibration step and the refreshed calibration step.

Generally speaking, the better the phase measurement, the more accurate the calibration. If the laser 2 is stable in frequency (and in phase, frequency noise and phase noise are related), results will be better.

To enhance the quality of the calibration, the laser absolute frequency is stabilized. This is done for instance by locking the laser 2 on an absorption line (gas cell) or on a temperature stabilized optical comb (for instance a Fabry-Perot resonator, a ring resonator etc). The cavity is a function of temperature but has much narrower resonance, thus allowing a finer frequency control. Classical locking methods with sideband Pound-Drever-Hall (PDH) can be performed with direct laser modulation, preferably with some synchronization with the measurement. Else PDH is done using a modulated version of the laser (for instance using the 5% output of a 95/5% coupler, the remaining 95% not being modulated and being used for the measurement).

As for Brillouin based distributed strain sensing, a DAS is temperature and strain cross-sensitive. DTS is used to correct slow thermal variations. If the DAS is measuring a highly dynamic signal, then a high pass filter will provide the strain variation without the thermal component and there is no temperature coupling. For very low frequency measurements, the DTS will allow to subtract the thermal component up to its repeatability (if the DTS measures 100 mK variations accurately, then any thermal information below 100 mK will be interpreted as strain).

Device

The step of determining the absolute value of the unknown state of temperature and/or the unknown state of strain, for at least one longitudinal position inside the optical fiber, is not performed in a purely abstract or purely intellectual manner but involves use of a technical means, typically by the unit 30.

The step of determining the absolute value of the unknown state of temperature and/or the unknown state of strain, for at least one longitudinal position inside the optical fiber is implemented by technical means (typically by unit 30), comprising at least one computer, and/or one central processing or computing unit, and/or one analogue electronic circuit (preferably dedicated), and/or one digital electronic circuit (preferably dedicated) and/or one microprocessor (preferably dedicated) and/or software means and/or a computer program product comprising instructions which, when the program is executed by a computer, cause the computer to carry out the step of determining the absolute value of the unknown state of temperature and/or the unknown state of strain and/or a computer-readable storage medium comprising instructions which, when executed by a computer, cause the computer to carry out the step of determining the absolute value of the unknown state of temperature and/or the unknown state of strain.

Device 1 does not comprise only the determination means 30.

The other means, in particular the optical means, are detailed in the below embodiments, in particular in reference to FIGS. 1 and 7.

Device 1 comprises: means for measuring the known state of temperature and/or of the known state of strain (DTS, DSS, thermometer, etc. as previously described) means for calibrating the optical fiber 11 (i.e. for implementing step 31) comprising means for measuring the signal 21, 22, 23, 34, 27 sensitive to an intensity and a phase of a Rayleigh backscattering signal of the optical fiber at a known state of temperature and a known state of strain, comprising reference(s) 2, 3, 4, 5, 6, 7, 8, 9, 10, 12, 13, 14, 15, 16, 17, 18, 19, and/or 33 described below, i.e. comprising one of the four following reflectometers: Wavelength scanning Optical Time Domain Reflectometer, Chirped pulse Optical Time Domain Reflectometer, Phase Optical Time Domain Reflectometer and Optical Frequency Domain Reflectometer; means for measuring the signal 25 sensitive to an intensity and a phase of a Rayleigh backscattering signal of the optical fiber at an unknown state of temperature and/or an unknown state of strain (i.e., for implementing step 32), comprising reference(s) 2, 3, 4, 5, 6, 7, 8, 9, 10, 12, 13, 14, 15, 16, 17, 18, 19, and/or 33 described below, i.e. comprising one of the four following reflectometers: Wavelength scanning Optical Time Domain Reflectometer, Chirped pulse Optical Time Domain Reflectometer, Phase Optical Time Domain Reflectometer and Optical Frequency Domain Reflectometer (but the same reflectometer or the same category of reflectometer than the means for calibrating the optical fiber 11); means for measuring and/or stabilizing and/or locking the frequency or wavelength or wavenumber of the laser beam of laser 2 as previously described (locking the laser 2 on an absorption line (gas cell) or on a temperature stabilized optical comb (for instance a Fabry-Perot resonator, a ring resonator etc.), using PDH, etc.) means for compensating a drift of the laser 2 as previously described (DTS, etc.) means 30 arranged to and/or configured to and/or programed to determine, the absolute value of the unknown state of temperature and/or the unknown state of strain, for at least one longitudinal position inside the optical fiber.

Example Embodiment for CP-DAS

We are now going to describe, in references to FIGS. 1 to 6, an example embodiment for CP-DAS.

An example embodiment of device 1 implementing method 100 for CP-DAS is illustrated in FIG. 1.

11 is the fiber undertest

Device 1 of FIG. 1 comprises the following means 2 to 10 and 12 to 19:

- 2 is the laser source
- 3 is an optical isolator preventing any back-reflection into the laser 2 and thus maintaining its stability
- 4 is an Electro-Optic Modulator (EOM), driven by the Arbitrary Waveform Generator 18 to create from laser 2 the frequency chirp required by the measurement system
- 5 is a Semi-conductor Optical amplifier (SOA) which is modulated using a square function to create a pulse out of the chirped light from EOM 4. The Delay generator 19 allows to adjust the pulse position within the chirp in the time line. The pulse allows localization of the returning signal because the backscattering is measured over time using the pump as a trigger (time of flight measurement)
- 6 is a coupler arranged to extract 1% of chirp signal from laser 2 (more precisely from SOA 5) for monitoring purposes (if needed)
- 7 is a Erbium Doped Fiber Amplifier (EDFA) arranged to create gain on the pulse from laser 2 (more precisely from SOA 5) in order to reach the required power in the fiber 11 for the measurement
- 8 is a band Pass filter (BPF) arranged to remove unnecessary spectral components form the modulated signal from laser 2 (more precisely from SOA 5 (and from EDFA 7))

9 is a coupler to extract 1% of chirp signal from laser 2 (more precisely from BPF 8) for monitoring purposes (if needed)

10 is a circulator to lunch chirped pulse from laser 2 (more precisely from BPF 8) into the fiber under test (11) and to recover backscattering and send it to detection

12 is an optical amplification (EDFA) arranged to adjust the Rayleigh backscattered signal from fiber 11 to the photodiode 16

13 is an optical bandpass filter (BPF) arranged to remove Amplified spontaneous emission (ASE) noise of EDFA 12 from the Rayleigh backscattered signal

14 is a coupler arranged to extract 1% of Rayleigh backscattered signal from fiber 11 for monitoring purposes (if needed)

15 is a variable Optical Attenuator (VOA) arranged to adjust level on Photodiode 16

16 is the detector or photodiode arranged for detecting the Rayleigh backscattered signal

17 is a digitizer arranged to obtain data in the digital domain from the Rayleigh backscattered signal

18 is the Arbitrary Waveform Generator previously described

19 is the Delay generator previously described.

30 is the unit previously described.

In this CP-DAS example, for the calibration step 31, as illustrated in FIG. 2: a first measurement is done for a given laser frequency $\lambda_0$ of laser 2, and the backscattering 22 is recorded by detector 16.

the measurement is repeated at $\lambda_{-1}$ resulting in backscattering 21, at $\lambda_1$ resulting in backscattering 23, etc. and so on at $\lambda_N$ resulting in backscattering 24. The measurement is performed over the full fiber length, although FIG. 2 is illustrated only at a loom window at a given position 26 in fiber 11.

The scan 20 (i.e. the successive acquisition of signals 21, 22, 23, 24) corresponds to the sweep of laser 2 on the axis of the frequency f of laser 2. Usually, there is a central wavelength $\lambda_c$/frequency fc for the laser 2 and the scan is done at two values $fc+f_{step}$ and $fc-f_{step}$, $fc+2f_{step}$ and $fc-2f_{step}$, etc The aim is to get typically at least 100 of such traces, each covering 25 GHz chirp and each separated by 75 MHz from the previous frequency/wavelength ($\lambda_0$ and $\lambda_1$ are 75 MHz apart and so on).

Note that temperature axis T is in the opposite direction from the frequency f scan:

$$\Delta v = v_C(-6.92\cdot 10^{-6})\cdot \Delta T = v_o(-0.78)\cdot \Delta\varepsilon$$

with:

$v_0=v_c$ and $\Delta v$ being the central frequency ($c/\lambda_c$, with c the speed of light)

$\tau_p$ being the duration of the chirped pulse defining the spatial resolution of the instrument $\Delta v$ being the frequency offset recorded during correlation T and $\Delta T$ being absolute Temperature and temperature variation $\Delta\varepsilon$ being elongation variation For each backscattering signal 21, 22, 23, 24 (and 25 described below) in FIG. 2: horizontal axis is the instant (time) t of acquisition, i.e. the distance d along fiber 11, vertical axis is expressed in arbitrary unit and is a function of the intensity and/or phase of the signal, During this calibration step 31, the temperature and/or the strain applied to the fiber 11 are known and controlled.

During the calibration step 31, the settings are the following: Temperature at calibration: 20° C. Strain at calibration: 0με.

Wavelength $\lambda_0=\lambda_c$: 1550.12 nm $f_{step}$=75 MHz between positions of f, 334 positions are measured (167 by increasing f, 167 by decreasing f) in order to scan a complete $\Delta f$=25 GHz bandwidth of the spectrum.

The corresponding $\lambda_{step}$ is computed by:

$$\lambda\text{step} = \frac{\Delta f\cdot\lambda^2}{c} = \frac{75e6\cdot(1550.12e-9)^2}{3e8} = \sim 0.6\ pm$$

Thus going from 1550.02 to 1550.22 nm for a total variation of $\Delta\lambda$=200 pm Each laser position is averaged 1000 times to get a good and stable measurement.

Pulse duration is typically ions. Chirp amplitude is typically 5 GHz

Then the Rayleigh measuring step 32 at the unknown state of temperature and/or unknown state of strain and the determination step are implemented as follows.

The setup is exactly the same than for the calibration step 31.

For step 32, the laser 2 is set at a wavelength λ, typically the central one $\lambda_c$ from the previous scan and does not move. The backscattering signal 25 is acquired along the fiber 11; again we concentrate on the backscattering 25 for the loom window at position 26, now in an unknown state (temperature and/or strain).

For the determination step, trace 25 is compared to each of the calibration traces 21 to 24 (cross-correlation) in order to find which one is the closes one (in the FIG. 2, 25 is close to 23 on 24 side).

The cross-correlation results in a figure with a maximum corresponding to the best match between 25 and all the reference curves 21, 22, 23, 24, etc.

FIG. 3 is an auto-correlation result of the determination step following steps 31 and 32 of FIG. 2, where the bottom axis is the wavelength position with respect to $\lambda_c=\lambda_0$ (in the center). Thus, for each cross-correlation 25×21, 25×22 etc, there is one point in FIG. 3, and when the cross-correlation is high, we get the peak.

The peak is fitted and the central position is found and can be between two measured traces (in this case somewhere between position 23 and position 24).

The distance between the center of the peak and $\lambda_c=\lambda_0$ corresponds to a frequency shift $\Delta v$ related to a change in T or strain thanks to equation:

$$\Delta v = v_o(-6.92\cdot 10^{-6})\cdot \Delta T = v_o(-0.78)\cdot \Delta\varepsilon$$

For instance, the correlation peak is offset by +0.6 pm from the central position, which corresponds to 75 MHz. Using this equation and assuming that we only have temperature variation (see below example of fiber in of FIG. 10), then:

$$\Delta v = v_o(-6.92\cdot 10^{-6})\cdot \Delta T = \frac{c}{\lambda_o}(-6.92\cdot 10^{-6})\cdot \Delta T$$

$$\Delta T = \frac{\Delta v\cdot\lambda_0}{c(-6.92\cdot 10^{-6})}$$

we have a temperature shift of −60 mK

Knowing the temperature/strain at $\lambda_0$, which was constant for all calibration, one can recover the absolute temperature/strain over time by applying successively the 25×21 to 24 auto-correlation function at every position along the fiber 11.

The same method applies for strain.

FIG. 4 illustrates the determined temperature over time following steps 31 and 32 of FIG. 2 (horizontal axis: time in hour; left vertical axis: frequency offset in Hz; right vertical axis: temperature in ° C. of fiber 11; greyscale level: correlation amplitude from low (dark) to high (white))

Looking over 24 h, one sees that the position of the correlation peak (seen from FIG. 4) slightly moves over time.

As illustrated in FIG. 5, looking over time only at the maximum value correlation curve 28 and comparing with a reference temperature measurement 29 (thermocouple), one sees a good match.

If the measurement is interrupted, then, when the instrument is turned on again, cross-correlation are done with the original reference and measurement resumes accordingly.

When the system was calibrated for strain (typically at zero strain), then measurement over time provide the local strain variation. For instance, using a piezo actuator, one sees a small variation of a couple of W as illustrated in FIG. 6.

Example Embodiment for Phase DAS or OFDR

We are now going to describe, in references to FIG. 7, an example embodiment for phase DAS or OFDR.

An example embodiment of device 1 implementing method 100 for Phase DAS and OFDR is illustrated in FIG. 7. Device 1 of FIG. 7 comprises references 2, 3, 5, 6, 7, 8, 10, 12, 13, 15, 16, 30 already described for FIG. 1.

Phase DAS and OFDR rely on a coherent detection to acquire the backscattering.

The local oscillator is superposed to the detection signal on the detector 16. The measured intensity on the photodiode 16 is the square of the sum of the two contributions $$I \propto [E_{sig}\cos(\omega_{sig}t+\varphi)+E_{LO}\cos(\omega_{LO}t)]^2 \propto \frac{1}{2}E_{sig}^{Q}+\frac{1}{2}E_{LO}^2+2E_{LO}E_{sig}\cos(\omega_{sig}t+\varphi)\cos(\omega_{LO}t)$$

The intensity of the signal 25 and of the local oscillator $$(E_{sig}^2 \text{ and } E_{LO}^2)$$

corresponds to the continuous contribution, stable over time, which does not bear any information to the measurement. They can be removed using a high pass filter.

Then, the $2E_{LO}E_{sig}\cos(\omega_{sig}t+\varphi)\cos(\omega_{LO}t)$ contribution that oscillate at the beat signal only is retrieved. It contains the phase information of the Rayleigh backscattering $\varphi$ and its amplitude $E_{sig}$.

Thus, the measured trace is exactly similar to the one formed for CP-DAS.

Coherent detection is achieved by deriving typically 1% of the laser flow (thanks to coupler 6) to form the local oscillator (LO). The LO is combined with the backscattering signal on the photodiode 16 using the 50/50 coupler 33. The photodiode 16, shown schematically as a single device is usually a balanced detector so that both arms of the 50/50 couplers are used. This directly filters out the $$(E_{sig}^2 \text{ and } E_{LO}^2)$$

signal.

Laser 2 is driven by λ0 for the central wavelength (this corresponds to the laser driver with stable current and stable temperature control).

For OFRD only: $\Delta\lambda$ is applied to continuously scan the laser over a wide range. In the case of the CP-DAS, it is achieved externally with an EOM. But it can also be directly achieved by driving a current ramp on the laser 2, which is what is done usually for OFDR (very large chirp).

In the Phase DAS case or OFDR case, for steps 31, 32 and determination step, reference measurement is made by scanning the laser 2, similarly to the CP-DAS and cross-correlation between traces is done afterwards for the measurement. Measurement step 32 and determination step are done as per CP-DAS.

Laser is set to $\lambda_0$, measurement is performed with averaging. Then the laser is moved and acquisition is performed again.

The settings are the same than in the CP-DAS case.

Example Embodiment for Lambda DAS

We are now going to describe, in references to FIGS. 7-9, an example embodiment for lambda DAS The example embodiment of device 1 implementing method 100 for lambda DAS is the same than for Phase DAS and OFDR and is thus illustrated in FIG. 7.

A lambda-DAS (or "lambda-scan") system is also retrieving phase like a phase-OTDR. In fact, once can consider that lambda-DAS is a phase-DAS that is scanning, contrary to a standard phase-DAS that does not scan (unless we need to calibrate).

For calibration step 31, reference measurement is made by scanning the laser 2, similarly to the CP-DAS. The Rayleigh backscattering is acquired over the distance for each wavelength.

Then, for each distance (corresponding to the pulse duration), the intensity on the photodiode 16 (from the coherent detection, e.g., made of the full intensity/phase interaction of the backscattering with the LO) is extracted over distance. Each of this wavelength slices built the references 27 as illustrated in FIG. 8.

The used settings are the following:

Temperature at calibration: 20° C.

Strain at calibration: 0με.

Wavelength $\lambda_c$: 1550 nm

−Δf=100 MHz between position

Scan 20 over typically 50 GHz, thus 500 positions in the spectrum

Each laser position is averaged 1000 times (typically) to get a good and stable measurement Pulse duration typically 1 ns From a processing point of view, the correlation is not done in the time/distance domain, but in the frequency domain. For this reason, the spatial resolution must be smaller.

For step 32, using the same settings, the laser 2 is scanned over 2 GHz only around the central wavelength $\lambda_0$. Thus, only a subset of FIG. 8 is measured, e.g. only $\lambda_1$, $\lambda_0$ and $\lambda_1$, corresponding to measurement 25 in FIG. 9. Measurement 25 is made at position 26 and is compared with reference 27.

When doing the auto-correlation, the max may not be centered around $\lambda_0$ but at $\lambda_1$. This corresponds to a frequency shift of 100 MHz and using $$\Delta T = \frac{\Delta v \cdot \lambda_o}{c(-6.92 \cdot 10^{-6})}$$

One finds a temperature shift of 70 mK.

Temperature Compensation

As illustrated in FIG. 10, in any embodiment or example previously described of the method 100, an embodiment of invention can be implemented in two different optical fibers 11 preferably at the same time (or in a delayed or slightly delayed manner):

In a first optical fiber 11, in, the first determination step (by unit 30) implemented for the first optical fiber 11, 111 being based on a shift of a frequency or temporal period or wavelength or wavenumber or a correlation between: the signal 21, 22, 23, 24, 27 sensitive to the intensity and the phase of a Rayleigh backscattering signal of the first optical fiber 111 at a first known state of temperature Ti1 and a first known state of strain Si1 and the signal 25 sensitive to the intensity and the phase of a Rayleigh backscattering signal of first the optical fiber 111 at a first unknown state of temperature Tu1 but at the first known state Si1 of strain, this first determination step of the first optical fiber determining the absolute value of the first unknown state Tu1 of temperature for at least one longitudinal position 26 inside the first optical fiber 1, 111.

In a second optical fiber 11, 112, the second determination step (by unit 30) implemented for the second optical fiber 11, 112 being based on:

The first determination step determining the absolute value of the first unknown state Tu1 of temperature for at least one longitudinal position inside the first optical fiber 11, 111, and A shift of a frequency or temporal period or wavelength or wavenumber or a correlation between: the signal 21, 22, 23, 24, 27 sensitive to the intensity and the phase of a Rayleigh backscattering signal of the second optical fiber 112 at a second known state of temperature Ti2 and a second known state of strain Si2 and the signal 25 sensitive to the intensity and the phase of a Rayleigh backscattering signal of second the optical fiber 112 at a second unknown state of temperature Tu2 (considered equal to Tu1) and at a second unknown state of strain Su2, this second determination step of the second optical fiber 11, 112 determining the absolute value of the second unknown state of strain Su2 for at least one longitudinal position 26 inside the second optical fiber 11, 112.

This can be implemented in a system according to embodiments of the invention comprising a first device and a second device. The first device may comprise any embodiment or example previously described of device 1, for measuring a temperature and/or a strain in the first optical fiber in. A second device may comprise any embodiment or example previously described of device 1, for measuring a temperature and/or a strain in a second optical fiber 112. The first device and the second device can have means in common, for example: —the same unit 30, and/or the same laser 2 (thanks to a 50/50 beam splitter or an optical switch). The first optical fiber 111 is in a protective sheath no protecting it from strain variation.

Thus, this variant of method 100 uses a cable with loose tube fiber in design (strain free) for temperature measurement and one tight buffer 112 sensitive to strain and temperature. Both fibers 111, 112 are calibrated.

During measurement, it is possible to measure temperature variation dT on loose tube in and to compensate (subtraction) on the tight buffer 112.

Sensitivity is typically: 1.3 GHz/K; 150 MHz/με

Of course, the invention is not limited to the examples which have just been described and numerous amendments can be made to these examples without exceeding the scope of the invention.

Of course, the different characteristics, forms, variants and embodiments of the invention can be combined with each other in various combinations.

The invention claimed is:

1. A method for measuring a temperature and/or a strain in an optical fiber, comprising:

calibrating the optical fiber by measuring a signal sensitive to an intensity and a phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and for at least one longitudinal position inside the fiber;

measuring the signal sensitive to an intensity and a phase of a Rayleigh backscattering signal of the optical fiber at an unknown state of temperature and/or an unknown state of strain, for various frequencies or wavelengths or wavenumbers of the backscattered signal and for at least one longitudinal position inside the fiber; and determining the absolute value of the unknown state of temperature and/or the unknown state of strain, for at least one longitudinal position inside the optical fiber, this determining step being based on a shift of frequency or temporal period or wavelength or wavenumber or a correlation between:

the signal sensitive to the intensity and the phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and the signal sensitive to the intensity and the phase of a Rayleigh backscattering signal of the optical fiber at an unknown state of temperature and/or an unknown state of strain.

2. The method according to claim 1, wherein the measurement of the signal sensitive to the intensity and the phase of a Rayleigh backscattering signal of the optical fiber at a known state of temperature and a known state of strain is done for more frequencies or wavelengths than the measurement of the signal sensitive to the intensity and the phase of a Rayleigh backscattering signal of the optical fiber at an unknown state of temperature and/or an unknown state of strain.

3. The method according to claim 1, wherein the measurement of the signal sensitive to the intensity and the phase of a Rayleigh backscattering signal of the optical fiber at a known state of temperature and a known state of strain is done for a frequency interval of at least 10 GHz.

4. The method according to claim 1, further comprising, before and/or during the calibration, performing a measurement or setting of the known state of temperature and/or of the known state of strain.

5. The method according to claim 4, wherein the measurement or setting of the known state of temperature and/or of the known state of strain is done less than one hour before the calibration.

6. The method according to claim 4, wherein:

the measurement or setting of the known state of temperature is done by measuring a temperature of the fiber with Distributed Temperature Sensing (DTS) using a Raman system or a Brillouin system, and/or with a thermometer, and/or a thermostat, and/or the measurement or setting of the known state of strain is done by measuring a strain of the fiber with Distributed Strain Sensing (DSS) using a Brillouin system, and/or a guide guaranteeing a given bending radius of the fiber.

7. The method according to claim 4, wherein the method simultaneously comprises:

the calibration, and the measurement or setting of the known state of temperature and/or of the known state of strain, and deployment of the fiber on site.

8. The method according to claim 1, wherein the calibration is done using one of the four following sensing techniques:

wavelength scanning optical time domain reflectometry, chirped pulse optical time domain reflectometry, phase optical time domain reflectometry, or optical frequency domain reflectometry.

9. The method according to claim 1, wherein the calibration and the measurement of the signal sensitive to the intensity and the phase of a Rayleigh backscattering signal of the optical fiber at an unknown state of temperature and/or an unknown state of strain are done using the same sensing technique.

10. The method according to claim 1, wherein the Rayleigh backscattering signal of the optical fiber at a known state of temperature and a known state of strain and the Rayleigh backscattering signal of the optical fiber at an unknown state of temperature and/or an unknown state of strain is obtained by injecting a laser beam in the optical fiber.

11. The method according to claim 10, wherein the Rayleigh backscattering signal of the optical fiber at a known state of temperature and a known state of strain and the Rayleigh backscattering signal of the optical fiber at an unknown state of temperature and/or an unknown state of strain is obtained by injecting the laser beam in the optical fiber while the frequency or wavelength or wavenumber of the laser beam is measured and/or stabilized and/or locked.

12. The method according to claim 10, further comprising a compensation of a drift of the laser between:

the measurement of the Rayleigh backscattering signal of the optical fiber at a known state of temperature and a known state of strain, and the measurement of the Rayleigh backscattering signal of the optical fiber at an unknown state of temperature and/or an unknown state of strain; and the compensation comprising:

refreshing the calibration of the optical fiber by measuring once again the signal sensitive to an intensity and a phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and for at least one longitudinal position inside the fiber, and taking into account, during the determination step of the absolute value of the unknown state of temperature and/or the unknown state of strain, for at least one longitudinal position inside the optical fiber, a drift of the signal sensitive to an intensity and a phase of a Rayleigh backscattering signal of the optical fiber at a known state of temperature and a known state of strain between the initial calibration step and the refreshed calibration step.

13. The method according to claim 1, wherein the method is implemented in two different optical fibers:

a first optical fiber, the determination step in the first optical fiber being based on a shift of a frequency or temporal period or wavelength or wavenumber or a correlation between the signal sensitive to the intensity and the phase of a Rayleigh backscattering signal of the first optical fiber at a first known state of temperature and a first known state of strain and the signal sensitive to the intensity and the phase of a Rayleigh backscattering signal of first the optical fiber at a first unknown state of temperature and the first known state of strain, this determination step of the first optical fiber determining the absolute value of the first unknown state of temperature for at least one longitudinal position inside the first optical fiber; and a second optical fiber, the determination step in the second optical fiber being based on:

the determination step determining the absolute value of the first unknown state of temperature for at least one longitudinal position inside the first optical fiber a shift of a frequency or temporal period or wavelength or wavenumber or a correlation between the signal sensitive to the intensity and the phase of a Rayleigh backscattering signal of the second optical fiber at a second known state of temperature and a second known state of strain and the signal sensitive to the intensity and the phase of a Rayleigh backscattering signal of second the optical fiber at a second unknown state of temperature and a second unknown state of strain, and the determination step of the second optical fiber determining the absolute value of the second unknown state of strain for at least one longitudinal position inside the second optical fiber.

14. The method according to claim 13, wherein the first optical fiber is in a protective sheath protecting it from strain variation.

15. A device for measuring a temperature and/or a strain in an optical fiber, comprising:

means for calibrating the optical fiber comprising means for measuring a signal sensitive to an intensity and a phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and for at least one longitudinal position inside the fiber, means for measuring the signal sensitive to an intensity and a phase of a Rayleigh backscattering signal of the optical fiber at an unknown state of temperature and/or an unknown state of strain, for various frequencies or wavelengths or wavenumbers of the backscattered signal and for at least one longitudinal position inside the fiber, determination means arranged to and/or configured to and/or programmed to determine the absolute value of the unknown state of temperature and/or the unknown state of strain, for at least one longitudinal position inside the optical fiber, based on a shift of frequency or temporal period or wavelength or wavenumber or a correlation between:

the signal sensitive to the intensity and the phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and the signal sensitive to the intensity and the phase of a Rayleigh backscattering signal of the optical fiber at an unknown state of temperature and/or an unknown state of strain.

16. The device according to claim 15, wherein the means for measuring the signal sensitive to the intensity and the phase of a Rayleigh backscattering signal of the optical fiber at a known state of temperature and a known state of strain are arranged for measuring the signal sensitive to the intensity and the phase of a Rayleigh backscattering signal of the optical fiber at a known state of temperature and a known state of strain for more frequencies or wavelengths than the measurement of the signal sensitive to the intensity and the phase of a Rayleigh backscattering signal of the optical fiber at an unknown state of temperature and/or an unknown state of strain.

17. The device according to claim 15, wherein the means for measuring the signal sensitive to the intensity and the phase of a Rayleigh backscattering signal of the optical fiber at a known state of temperature and a known state of strain are arranged for measuring the signal sensitive to the intensity and the phase of a Rayleigh backscattering signal of the optical fiber at a known state of temperature and a known state of strain for a frequency interval of at least 10 GHz.

18. The device according to claim 15, further comprising means for measuring or setting the known state of temperature and/or of the known state of strain.

19. The device according to claim 18, wherein:

the means for measuring or setting the known state of temperature comprise means for measuring a temperature of the fiber with Distributed Temperature Sensing (DTS) using a Raman system or a Brillouin system, and/or a thermometer, and/or a thermostat, and/or the means for measuring or setting the known state of strain comprise means for measuring a strain of the fiber with Distributed Strain Sensing (DSS) using a Brillouin system, and/or a guide arranged for guaranteeing a given bending radius of the fiber.

20. The device according to claim 18, wherein the device is arranged for simultaneously:

calibrating the fiber by the means for calibrating, and measuring or setting the known state of temperature and/or the known state of strain by the means for measuring or setting the known state of temperature and/or of the known state of strain, and deploying the fiber on site by deploying means.

21. The device according to claim 15, wherein the means for calibrating the fiber comprise one of the four following reflectometers:

wavelength scanning optical time domain reflectometer, chirped pulse optical time domain reflectometer, phase optical time domain reflectometer, or optical frequency domain reflectometer.

22. The device according to claim 15, wherein the means for calibrating the fiber and the means for measuring the signal sensitive to the intensity and the phase of a Rayleigh backscattering signal of the optical fiber at an unknown state of temperature and/or an unknown state of strain comprise the same reflectometer or the same category of reflectometer among wavelength scanning optical time domain reflectometer, chirped pulse optical time domain reflectometer, phase optical time domain reflectometer, and optical frequency domain reflectometer.

23. The device according to claim 15, further comprising means for injecting a laser beam in the optical fiber arranged to generate the Rayleigh backscattering signal of the optical fiber at a known state of temperature and a known state of strain and arranged to generate the Rayleigh backscattering signal of the optical fiber at an unknown state of temperature and/or an unknown state of strain.

24. The device according to claim 23, further comprising means for measuring and/or stabilizing and/or locking the frequency or wavelength or wavenumber of the laser beam while the laser beam is injected in the fiber in order to generate the Rayleigh backscattering signal of the optical fiber at a known state of temperature and a known state of strain or in order to generate the Rayleigh backscattering signal of the optical fiber at an unknown state of temperature and/or an unknown state of strain is obtained by injecting a laser beam in the optical fiber.

25. The device according to claim 23, further comprising means for compensating a drift of the laser between:

the measurement of the Rayleigh backscattering signal of the optical fiber at a known state of temperature and a known state of strain, and the measurement of the Rayleigh backscattering signal of the optical fiber at an unknown state of temperature and/or an unknown state of strain; and the compensation means comprising:

the means for calibrating the optical fiber, arranged to and/or configured to and/or programmed to refresh the calibration of the optical fiber by measuring once again the signal sensitive to an intensity and a phase of a Rayleigh backscattering signal of the optical fiber at a known state of temperature and a known state of strain, for various conditions of frequencies or wavelengths or wavenumbers of the backscattered signal and/or of known states of temperature and/or known states of strain, and for at least one longitudinal position inside the fiber, and the determination means arranged to and/or configured to and/or programmed to take into account, during the determination of the absolute value of the unknown state of temperature and/or the unknown state of strain, for at least one longitudinal position inside the optical fiber, a drift of the signal sensitive to an intensity and a phase of a Rayleigh backscattering signal of the optical fiber at a known state of temperature and a known state of strain between an initial calibration of the fiber and a refreshed calibration of the fiber.

26. The device according to claim 15, further comprising a protective sheath arranged for protecting the fiber from strain variation.

27. A system comprising:

a first device according to claim 15, for measuring a temperature and/or a strain in a first optical fiber, a second device according to claim 15, for measuring a temperature and/or a strain in a second optical fiber, wherein:

the determination means of the first device being arranged and/or configured and/or programmed, based on a shift of a frequency or temporal period or wavelength or wavenumber or a correlation between:

the signal sensitive to the intensity and the phase of a Rayleigh backscattering signal of the first optical fiber at a first known state of temperature and a first known state of strain and the signal sensitive to the intensity and the phase of a Rayleigh backscattering signal of first the optical fiber at a first unknown state of temperature but the first known state of strain, to determine the absolute value of the first unknown state of temperature for at least one longitudinal position inside the first optical fiber, the determination means of the second device being arranged and/or configured and/or programmed, based on:

the absolute value of the first unknown state of temperature for at least one longitudinal position inside the first optical fiber, determined by the determination means of the first device, and a shift of a frequency or temporal period or wavelength or wavenumber or a correlation between:

the signal sensitive to the intensity and the phase of a Rayleigh backscattering signal of the second optical fiber at a second known state of temperature and a second known state of strain and the signal sensitive to the intensity and the phase of a Rayleigh backscattering signal of second the optical fiber at a second unknown state of temperature and a second unknown state of strain, to determine the absolute value of the second unknown state of strain for at least one longitudinal position inside the second optical fiber.

28. The device according to claim 27, wherein the first optical fiber is in a protective sheath protecting it from strain variation.

* * * * *